(12) United States Patent
Kiesbauer et al.

(10) Patent No.: US 8,056,418 B2
(45) Date of Patent: Nov. 15, 2011

(54) METHOD AND DEVICE FOR TESTING THE FUNCTIONALITY OF AN ACTUATOR HAVING A PNEUMATIC DRIVE

(75) Inventors: Jörg Kiesbauer, Eppertshausen (DE); Domagoj Vnucec, Mannheim (DE)

(73) Assignee: Samson AG, Frankfurt am Main (DE)

( * ) Notice: Subject to any disclaimer, the term of this patent is extended or adjusted under 35 U.S.C. 154(b) by 173 days.

(21) Appl. No.: 12/541,103

(22) Filed: Aug. 13, 2009

(65) Prior Publication Data

US 2010/0050786 A1 Mar. 4, 2010

(30) Foreign Application Priority Data

Sep. 4, 2008 (DE) .......................... 10 2008 045 775

(51) Int. Cl.
*G01L 7/00* (2006.01)
(52) U.S. Cl. ........................................................ 73/714
(58) Field of Classification Search ........................ None
See application file for complete search history.

(56) References Cited

FOREIGN PATENT DOCUMENTS

| DE | 10 2005 004 477 A1 | 8/2006 |
|---|---|---|
| GB | 2372087 A | 2/2001 |
| WO | 2007/087030 A1 | 8/2007 |

*Primary Examiner* — Andre Allen
(74) *Attorney, Agent, or Firm* — Woodling, Krost and Rust

(57) ABSTRACT

The invention relates to a method for monitoring the functionality of an actuator (1) having a pneumatic drive (2), in particular for monitoring an actuator (1) for a safety valve, including a magnetic valve (4) for controlling the pneumatic drive (2), wherein the magnetic valve (4) is monitored by means of a pressure measurement and is, for this purpose, connected to a first pneumatic conduit (16) to a position controller (3) of the actuator (1) as well as to the pneumatic drive (2) to a second pneumatic conduit (17). The magnetic valve (4) is switched off and on again with a switching time (t2-t1). The switching time (t2-t1) of the magnetic valve (4) is detected at which, at the one hand, the switching time (t2-t1) is so short that the position of the actuator (1) remains essentially constant or unchanged and, on the other hand, it is, however, so long that a pressure drop (dp=P1-P2) in the first pneumatic conduit (16) in front of the magnetic valve (4) is present after switching the magnetic valve (4) on again.

21 Claims, 3 Drawing Sheets

METHOD AND DEVICE FOR TESTING THE FUNCTIONALITY OF AN ACTUATOR HAVING A PNEUMATIC DRIVE

This patent application claims priority to German Patent Application Serial No. DE 10 2008 045 775.2 filed Sep. 4, 2008.

FIELD OF THE INVENTION

The invention pertains to a method and a device for testing the functionality of an actuator, in particular for monitoring an actuator for a safety valve, the actuator being driven by a pneumatic drive including a magnetic valve.

BACKGROUND OF THE INVENTION

In safety-oriented industries, especially in the chemical industry or in power stations, safety valves have to be tested regularly with respect their functionality. Safety valves are used only rarely because they are intended only for the case of emergency.

Pneumatic drives are known which serve as an actuator of a safety valve. As a rule, safety valves are controlled in a safety circuit by means of a magnetic valve such that the same vents the pneumatic drive in the case of emergency by a voltage drop of the supply voltage such that the safety valve is moved into a safety position. The movement into the safety position is effected, in a manner known per se, by means of an energy memory which is realised by springs arranged in the drive means.

For correct function of the safety valve, the actual actuator as well as the magnetic valve have to operate reliably. For monitoring the functionality of an actuator in an actuation system, the so called partial-stroke-test method is known.

Such a partial-stroke-test method is described, for example, in DE 10 2005 004 477 A1. In this method, the actuator is moved briefly by its drive element over a portion of its actuating path to test its functionality. Overshooting is prevented thereby that the drive element can be moved, for example by means of a stop, only within permitted limits. Known partial-stroke-test methods use a position controller in order to determine the correct functionality of the actuator by means of partial movements.

A further device for monitoring a safety valve is known from GB 2 372 087 A. In this method, a control valve is moved up to a predetermined point by means of a test method. The test is started by a laptop or computer. For this purpose, a magnetic valve is shut down like in a case of emergency, but switched on again after a predetermined time. Pressure sensors or flow sensors determine the functionality of the safety valve based on changes in the process medium, and a failure notification is displayed upon occurrence of a failure by means of lamps or a display screen.

By means of this test, it can be tested whether a valve is unduly blocked, whether a spring of the actuator or the valve, respectively, is broken, whether corrosion is present at the valve ball or whether an undesired crystal formation is present.

All these tests pertain to the functionality of the actuator and they are not adapted to check a failure function of the magnetic valve associated with the actuator.

From WO 2007/087030 A1, a device is known which checks a failure of the magnetic valve. The device comprises, for this purpose, a position controller which comprises two outputs—double acting controller—and two pressure sensors. The magnetic valve is connected to the position controller of the actuator through a first pneumatic conduit and a first pressure sensor being provided at the position controller. The magnetic valve is connected to the pneumatic drive by means of a second pneumatic conduit in which a second pressure sensor is arranged at the position controller. The device comprises a circuit for controlling a single-acting pneumatic drive. The circuit provides for connecting the second output of the position controller which is normally not used in this case, with the pneumatic conduit between the magnetic valve and the driving volume. For testing the magnetic valve, the valve is momentarily shut down such that a pressure change or a differential pressure change, respectively, of the pressure sensors in the position controller can be evaluated. Depending on the magnitude of the measured pressure change of the pressure in the pneumatic drive or in the pneumatic conduit between the magnetic valve and the pneumatic drive, respectively, the position controller can decide on the functionality of the magnetic valve.

The requirement of a double acting position controller for a single acting drive is disadvantageous in this arrangement. A single acting position controller for a single acting drive, however, would be advantageous. Furthermore, a reliable pneumatic connection of the second output of the position controller is necessary and, thereby, increases the complexity when installing the pneumatic connection conduits. Furthermore, each additional pneumatic conduit forms a possible source of failure.

Furthermore, if no pressure sensor is provided between the magnetic valve and the pneumatic drive, there is the problem that a momentary pressure change can not be determined during switching the magnetic valve on and off. In particular, a single acting position controller even if it comprises a pressure sensor for measuring the pressure of the pneumatic output, can not determine a pressure change between the magnetic valve and the pneumatic drive during switching the magnetic valve on and off, since the switching of the magnetic valve interrupts the pneumatic connection between the position controller and the pneumatic drive.

SUMMARY OF THE INVENTION

It is an object of the invention, to further develop a method and a device for testing the functionality of an actuator being driven by a pneumatic drive including a magnetic valve such that testing of the functionality of a magnetic valve is possible in a simple and economic way.

For this purpose, a method for testing the functionality of an actuator with a pneumatic drive in particular for a safety valve, and having a magnetic valve for controlling the pneumatic drive, is provided wherein the magnetic valve is monitored by means of a pressure measurement and is connected, for this purpose, through a first pneumatic conduit with a position controller of the actuator as well as with the pneumatic drive through a second pneumatic conduit, wherein the magnetic valve is switched off and on again with a switching time, which switching time of the magnetic valve is detected at which, on the one hand, the switching time is so short that the position of the actuator remains essentially constant or unchanged and, on the other hand, is so long that a pressure drop in the first pneumatic conduit is present in front of the magnetic valve after switching the magnetic valve on again.

By means of the invention, the testing of the magnetic valve is possible without the above mentioned deficiencies.

The invention is based on the finding that it is surprisingly possible to detect an occurring pressure change at the output side of the magnetic valve with only one pressure measurement on the input side of the magnetic valve. By using a period of time after finishing the switching on and off for the testing, it is possible, to infer back to a previously happened pressure change on the output side of the magnetic valve on the basis of the pressure equalisation of a pressure change on the output side of the magnetic valve.

Notably, if the magnetic valve is not venting upon switch off, no pressure drop will arise in front of the magnetic valve after switching it on again. If, on the other hand, the magnetic valve shuts down, but does not correctly switch on again thereafter, a pressure drop will occur in front of the magnetic valve, where the pressure will not rise again.

The proof of the functionality of the magnetic valve occurs indirectly and at a time only after finishing the switching on and off of the magnetic valve. Because of the short switching time of the magnetic valve, this has, however, no disadvantage in practise. According to the invention, the magnetic valve is switched off and on again with a switching time. The switching time of the magnetic valve is determined, such that, at the one hand, the switching time is so short that the position of the actuator remains essentially constant or unchanged, and, on the other hand, is so long that a pressure drop in the first pneumatic conduit in front of the magnetic valve is present after switching on the magnetic valve again.

According to an embodiment of the invention, the pressure measurement is carried out only in the first pneumatic conduit. The measured switching time is used in order to test the functionality of the magnetic valve by means of a pressure drop in the first pneumatic conduit.

Preferably, the magnetic valve is switched off and on again with a variable time span, in a first step. Thereby, several reference data are acquired which contain at least an information as to the switching time of the magnetic valve. At least that switching time is stored at which the position of the actuator remains essentially unchanged and at which the pressure drop happens after switching on the magnetic valve again. In a second step, a test routine is carried out which switches the magnetic valve off and on again for the duration of the switching time stored in the first step, and the occurring pressure change in the first pneumatic conduit in front of the magnetic valve is measured. The pressure change in the first pneumatic conduit in front of the magnetic valve is taken as a measured control signal from which the status of the magnetic valve can be determined. A status notification for describing the status of the magnetic valve is then displayed, in particular as a visual or electrical notification.

Therein, in particular the pressure drop in the pneumatic conduit during the first step is stored. The pressure change in the first pneumatic conduit occurring in the second step, is compared to the stored pressure drop. A status notification is issued based on the difference of the two pressure changes.

According to a further embodiment of the invention, the pressure change occurring in the second step in the first pneumatic conduit in front of the magnetic valve, is compared to the stored pressure drop, and a status notification is issued on the basis of the difference of the two pressure changes.

The measured pressure changes can be stored. A tendency is evaluated, and a status notification is generated which produces a warning signal also in the case of a still functioning magnetic valve on the basis of the tendency of the stored data.

Preferably, the status notification is generated on the basis of a comparison of the measured pressure difference with a stored, allowed value of the change of a tolerance value of the pressure.

In particular, this allowed tolerance value is evaluated during the first step of generating the reference data by varying the switching time.

As an alternative thereto, the allowed tolerance value can be permanently stored in the memory and is not evaluated during carrying out the method.

However, it is also possible, that the allowed tolerance value for the actual configuration is calculated from stored reference values and data which are input by the user.

For the above purpose, a device for testing the functionality of an actuator with a pneumatic drive in particular for a safety valve, and having a magnetic valve for controlling the pneumatic drive, is provided, comprising a position controller and one single pressure sensor for measuring the pressure in the first pneumatic conduit.

In a preferred embodiment of the invention, the device comprises a position controller, a magnetic valve, an actuator which comprises a pneumatic drive with a safety position, a control means which switches the magnetic valve off and on with variable time lengths, and a memory which stores at least a switching time in which the position of the actuator remains constant or unchanged, a control unit, in particular the control means which initiates a test during which, at the one hand, the magnetic valve is switched off and on again for the stored switching time and, on the other hand, the arising pressure change in the first pneumatic conduit is measured, and an output unit for outputting a status notification.

Preferably, the pressure sensor is arranged within the position controller.

In particular, the position controller is implemented as a digital position controller.

According to an embodiment of the invention, a unit is provided, in particular a control means, for testing the magnetic valve such that the position controller gets a signal for initiating the monitoring of a pressure change in the first pneumatic conduit.

Preferably, the position controller is implemented such that it gets the information for initiating the test of the magnetic valve by means of a signal modulated onto the signal line, by means of a HART Signal, by means of a radio signal or by means of an additional input for a current or voltage signal.

The position controller can, above all, be electrically connected to the magnetic valve such that it initiates the switching of the magnetic valve.

A further understanding of the nature and advantages of the embodiments of the present invention may be realized by reference to the remaining portions of the specification and the drawings.

DESCRIPTION OF THE SPECIFIC EMBODIMENTS

Figure 1:
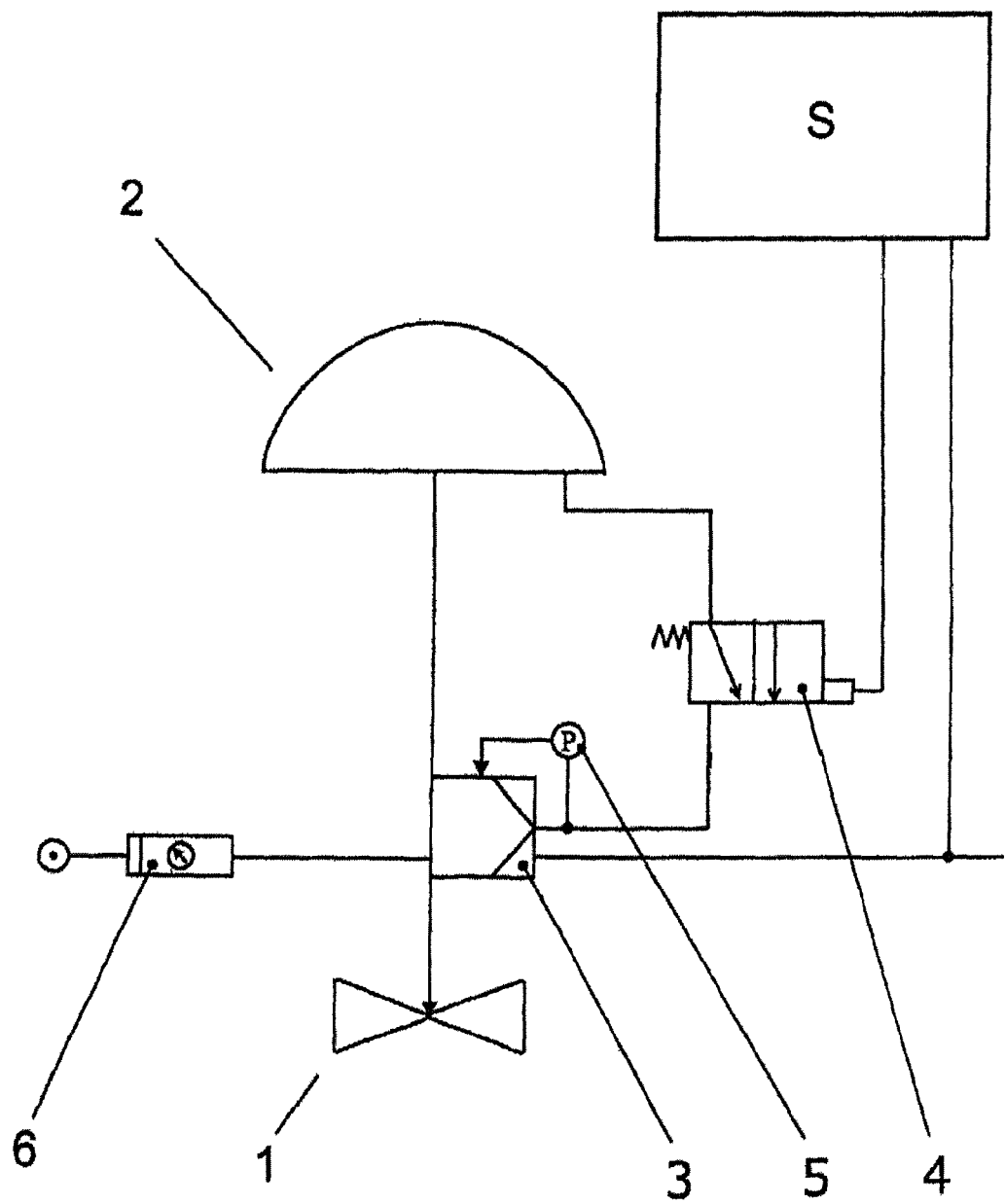
FIG. 1 shows a schematic representation of a device according to the invention

The invention is described in more detail, in the following, with reference to the embodiment shown in the drawings. In the specification, in the patent claims, the abstract and in the drawings.

The terms used in the drawings, the terms used in the list of reference characters below and the related reference characters are provided.

FIG. 1 shows a representation of a device for carrying out the method of the invention. In particular, an actuator 1 is shown. The actuator 1 comprises a pneumatic actuating drive 2 shown in more detail in FIG. 2, a position controller 3 and a magnetic valve 4. For measuring the pressure in the first pneumatic conduit 16 between the position controller 3 and the magnetic valve 4, a single pressure sensor 5 is provided which preferably outputs a signal to the position controller 3. There is direct electrical connection from the position controller 3 to the pressure sensor 5 as is supposed to be illustrated by the arrow in the FIGS. 1 and 2. The pressure sensor 5 can be arranged within the position controller 3.

A filter controller 6 provides the pneumatic supply of the position controller 3 and also of the magnetic valve 4 in case the magnetic valve 4 uses pneumatic auxiliary energy which is not shown in more detail.

The magnetic valve 4 as well as the signal input of the position controller 3 is connected to a control unit S, which can, for example, be implemented as a safety control—SIS safety instrumented system—. It is also possible to connect separate controls to the magnetic valve 4 and the position controller 3, where the separate controls are communicating with each other. For example, a safety control may be connected to the magnetic valve 4 and/or a standard process control may be connected to the position controller 3.

Figure 2:
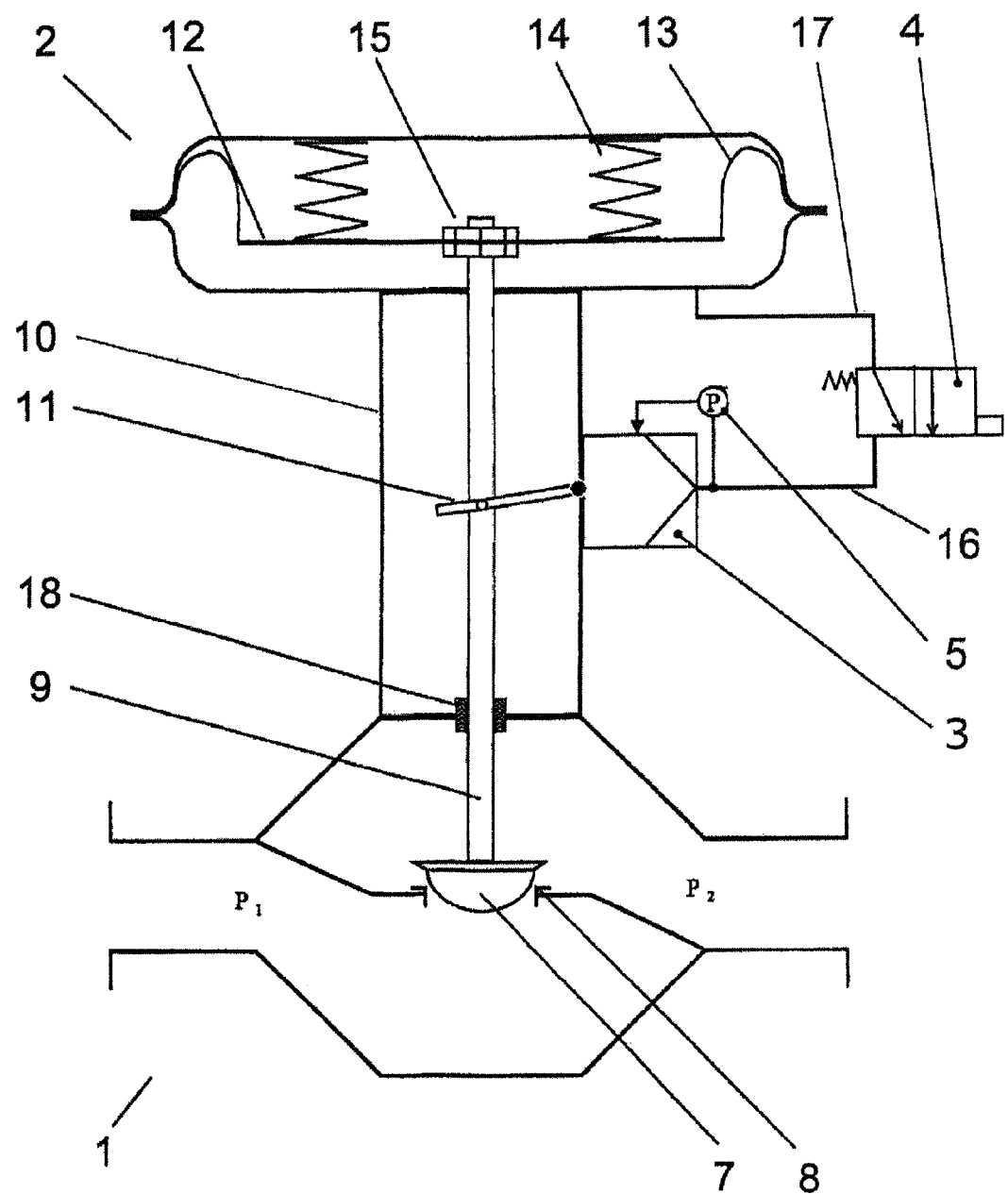
FIG. 2 shows a representation of a pneumatic actuator of the device

The function of the position controller 3 is shown with reference to FIG. 2. The actuator 1 comprises a throttle body 7 which opens or closes a valve seat 8 and which uncovers a variable sectional area depending on its position. An input pressure P1 of a process medium is effective at the input of the actuator 1, whereby an output pressure P2 is generated at the output depending on the controlled position of the throttle body 7. The area uncovered between the throttle body 7 and the valve seat 8 determines the flow of the process medium, and, thereby, also the output pressure P2.

The position controller 3 serves for controlling the position of the throttle body 7. The position controller 3 receives a target value signal which is not shown in more detail. The position controller 3 measures a valve position, for example by means of a lever 11 which detects a movement of the throttle body 7 at a valve stem 9 which is surrounded by a bellows 10 for protection. Furthermore, the position controller 3 generates a pressure which acts in between the position controller 3 and the magnetic valve 4 through a first pneumatic conduit 16. This pressure also acts on a second pneumatic conduit 17 which is provided between the pneumatic drive 2 and the magnetic valve 4, and, therefore, it acts also on the control drive 2. The output pressure P acts against the force of springs 14 which abut on a drive plate 12, supported within the control drive 2 by a membrane 13. Force equilibrium between the spring force and the pressure determines the position of the valve stem 9 and, thereby, of the throttle body 7 since the valve stem 9 is coupled to the drive plate 12, i.e. by connection means, for example by means of a screw 15.

Figure 3A:
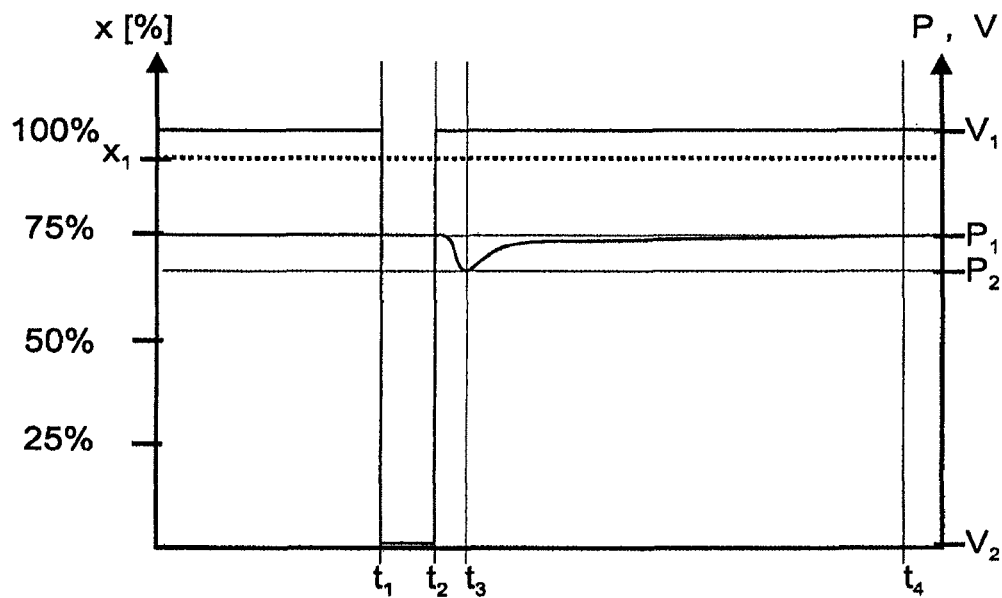
FIG. 3a shows a first pressure drop curve

FIG. 3a shows signals which are relevant during carrying out of the method. Therein, a valve position x, a switching signal V of the magnetic valve 4 and a pressure P in the first pneumatic conduit 16 of the position controller 3 and the magnetic valve 4 are shown.

In a first step of the method, the magnetic valve 4 is switched off at the time t1 by lowering the voltage at the magnetic valve 4 from V1 to V2. Therein, the valve 4 is in a valve position x1. In this position, a pressure is present in the drive which corresponds to the pressure P in front of the magnetic valve 4. Preferably, this position corresponds to a position of the valve which is usual in normal operation.

The magnetic valve 4 is switched on again at the time t2. The valve position x1 remains unchanged if the switching time t2−t1 is not too long. The explanation of this behaviour is to be seen in that the drive pressure changes in a hardly noticeable way when the magnetic valve 4 vents only briefly and, thereby, vents only a very small air stream. A momentary pressure drop in the second pneumatic conduit 17 is not noticeable in the drive pressure if the change is only very short and the volume of the pneumatic conduit 17 is very small compared to the drive volume.

After switching the magnetic valve 4 on again at the time t2, a momentary pressure drop to the pressure P2 at the time t3 is noticeable in the first pneumatic conduit 16 because the pressure in front of the magnetic valve 4 equalizes with the pressure in the back of the magnetic valve 4.

During the method of the invention, the switching time t2−t1 is varied, and at least one value is stored at which the valve position remains unchanged and the switching time is long enough to detect a reproducibly measured change of the measure P1-P2.

Figure 3B:
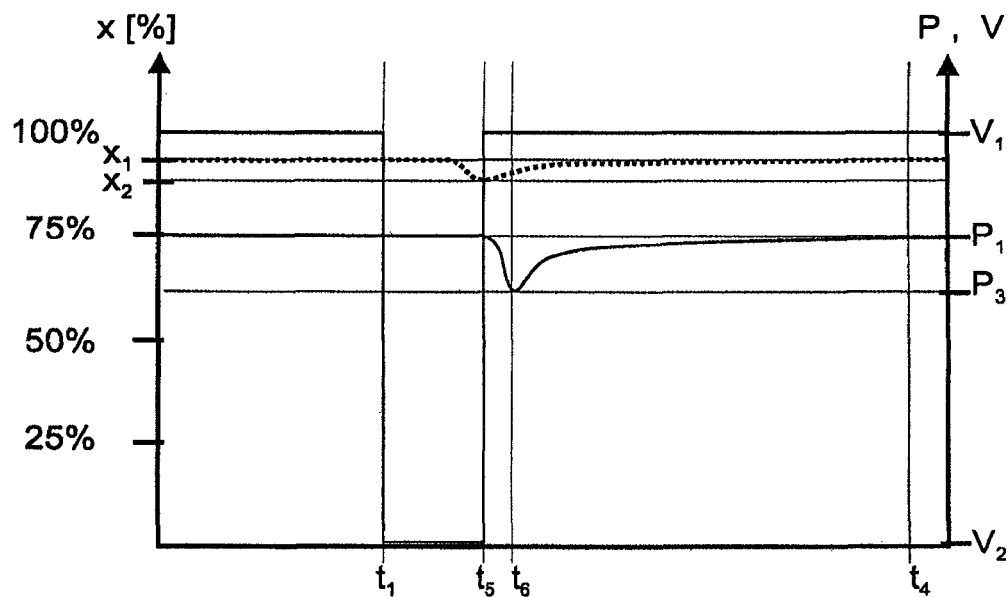
FIG. 3b shows a second pressure drop curve

It is shown in FIG. 3b, how the valve position changes from x1 to x2 when the switching time is made longer. The magnetic valve 4 is only switched on again at the time t5 which is after the time t2. Also in this case, a pressure drop P1-P3 is noticeable at the time t6. This pressure drop is even somewhat larger in FIG. 3a since the valve position changes, i.e. a larger pressure drop must have been present.

However, also with the procedure according to FIG. 3b, the functionality of the magnetic valve 4 can be checked. According to the invention, however, essentially no change in the valve position x1-x2 should be present since such a change could interfere with a process.

The device according to the invention consists essentially out of the actuator 1, the pressure sensor 5 for measuring the pressure in the first pneumatic conduit 16, at least the magnetic valve 4 and the control unit S connected to the magnetic valve 4 and the position controller 3.

The connection for the transmission of signals between the magnetic valve 4, the position controller 3 and the control unit S can be made in different ways. For example, voltage signals on a cable connection can be used, for example with a direct voltage of 24 Volt direct current which is usual for magnetic valves. Also current signals on the cable connection, in particular 4-20 mA as usual for position controllers, can be used. It is also possible that a digital communication by means of a field bus, for example a Profibus or Foundation Fieldbus, is used for arbitrary field devices. A radio connection, such as ZigBee, VLAN or Bluetooth, can also be considered.

In a particularly advantageous embodiment of the device, the pressure sensor 5 is integrated into the position controller 3 wherein the switching of the magnetic valve 4 is initiated by the control unit S. The position controller 3 obtains the information on the switching time t1 through a field bus connection. The position controller 3 compares pressure changes arising at its output, generates a status notification related to the status of the magnetic valve 4, and transmits it in a digital format though the field bus.

The method for monitoring the functionality of the actuator 1, preferably by means of a single-acting pneumatic drive 2 and the magnetic valve 4, can be carried out as follows. In a first step, reference data are acquired. These contain at least one information as to the switching time of the magnetic valve 4. The pneumatic drive 2 is put under pressure. The magnetic valve 4 is switched off and on with variable lengths of time. At least that switching time—dt=t2−t1—is stored for which the position of the actuator 1 remains essentially constant or unchanged. After switching the magnetic valve 4 on again, a pressure drop—dp=P1−P2—in the first pneumatic conduit 16 in front of the magnetic valve 4 is detected. In a second step, a routine is carried out which switches the magnetic valve 4 off and on again for the duration of a switching time stored in the first step. The arising pressure change dp in the pneumatic feeding line or the conduit 16, respectively, is measured in front of the magnetic valve 4. The status of the magnetic valve 4 is determined from this pressure change. In particular, the pressure change in the first pneumatic conduit 16 in front of the magnetic valve 4 is taken as a measured control signal from which the status of the magnetic valve can be determined. A status notification for describing the status of the magnetic valve 4 is generated and transmitted as a visual or electronic notification.

The pressure drop—$dp=P1-P2$—in the first pneumatic conduit 16 in front of the magnetic valve 4 is stored during the first step. The pressure change dp occurring in the second step in the first pneumatic conduit 16 in front of the magnetic valve 4 is compared to the stored pressure drop whereby an expanded status notification is issued on the basis of the difference between the two pressure changes. This expanded status notification can indicate that the magnetic valve 4 is still functional, however does not possess the same valve characteristics as a new, functional magnetic valve anymore.

The pressure changes measured during carrying out the test method, are stored. A tendency is evaluated, and a status notification is generated which, with a still functioning magnetic valve 4, generates a warning signal on the basis of the tendency of the stored data and transmits this information as a visual or an electronic notification.

The status notification will be generated on the basis of a comparison of the measured pressure change with a stored, allowed value of the change of this pressure, i.e. with a tolerance value. This allowed tolerance value can be evaluated during the first step of the generation of the reference data by varying the switching time. This allowed tolerance value can, however, also be stored permanently in a memory, i.e. it is not evaluated during carrying out the test method. This allowed tolerance value can, alternatively, be calculated for the actual configuration out of stored reference values and on the basis of data which are input by the user.

The position controller is, preferably, implemented as a digital position controller. It comprises the pressure sensor 5 for measuring the pressure in the first pneumatic conduit 16. Furthermore, the unit, in particular the control unit S, is provided which switches the magnetic valve 14 off and on in variable time lengths. At least a switching time—$dt=t2-t1$—is stored during which the position of the actuator 1 remains unchanged. There is a further unit which is, in particular, contained in the control unit S, which initiates a test during which, at the one hand, the magnetic valve 4 is switched off and on again for the stored switching time and, on the other hand, the arising pressure change dp in the second pneumatic conduit is measured in front of the magnetic valve 4 such that the status of the magnetic valve 4 is determined from this pressure change. In particular, the pressure change in the first pneumatic conduit 16 in front of the magnetic valve 4 is taken as a measured control signal from which the status of the magnetic valve can be determined. Furthermore, an output unit (not shown) for a visual display or an electronic output of a status notification is provided.

The testing of the magnetic valve 4 is initiated by the control unit S. The position controller 3 receives a notification for initiating the monitoring of a pressure change in the first pneumatic conduit 16.

The position controller 3 receives the information for initiating the test of the magnetic valve for example by means of a signal modulated onto the signal line. Alternatively, the position controller 3 can receive the information for initiating the test of the magnetic valve by means of a HART signal. A first alternative is that the position controller 3 receives the information by means of a radio signal. It is also possible, that the position controller 3 receives this information by means of an additional input for a current or a voltage signal. However, the position controller 3 initiates the switching of the magnetic valve 4. The control unit S receives the information as to the detected pressure change dp in the pneumatic conduit 16 in front of the magnetic valve 4 by means of the HART signal, the radio signal or the additional input for a current or a voltage signal, respectively. The position controller 3 can generated a status notification for describing the status of the magnetic valve 4 and transmit the same visually or in an electronic format. The control unit S can, additionally, generate a status notification for describing the status of the magnetic valve 4 and can transmit the same visually of in an electronic format. The control unit S as can receive the information as to the detected pressure change dp in the pneumatic conduit 16 in front of the magnetic valve 4 also by means of a signal which is modulated onto the signal line.

The solution according to the invention consists in that the magnetic valve 4 is switched off and on again with a switching time $t2-t1$, and that that switching time $t2-t1$ of the magnetic valve is determined at which, at the one hand, the switching time is so short that the position of the actuator 1 remains essentially unchanged, and that, on the other hand, it is, however, so long that a pressure drop $dp=P1-P2$ is present in the pneumatic conduit 16 in front of the magnetic valve 4 after the magnetic valve 4 has been switched on again. Therefore, the pressure measurement is carried out only in the first pneumatic conduit 16, and the detected switching time is used in order to examine the functionality of the magnetic valve 4 based on a pressure drop $dp=P1-P2$ in the first pneumatic conduit 16.

It is to be understood that the above description is intended to be illustrative and not restrictive. Many embodiments will be apparent to those skilled in the art upon reviewing the above description. The scope of the invention should, therefore, be determined not as reference to the above description, but should instead be determined with reference to the appended claims along with the full scope of equivalence to which such claims are entitled.

LIST OF REFERENCE SIGNS

1 actuator
2 pneumatic drive
3 position controller
4 magnetic valve
5 pressure sensor
6 filter controller
7 throttle body
8 valve seat
9 valve stem
10 bellows
11 lever
12 drive plate
13 membrane
14 springs
15 screws
16 first pneumatic conduit
17 second pneumatic conduit
P1 input pressure
P2 output pressure
S control unit

The invention claimed is:

1. Method for monitoring the functionality of an actuator for a safety valve, said actuator includes a pneumatic drive and a magnetic valve for controlling said pneumatic drive, comprising the steps of:

monitoring said first pneumatic conduit by measuring pressure in said first pneumatic conduit, said first pneumatic conduit interconnecting a position controller of said actuator and said magnetic valve, a second pneumatic conduit interconnecting said magnetic valve and said pneumatic drive;

switching said magnetic valve from a first state to a second state at time t1, said first state of said magnetic valve interconnecting said first pneumatic conduit and said second conduit enabling communication therebetween, said second state of said magnetic valve venting said magnetic valve, said first and said second pneumatic conduits;

switching said magnetic valve from said second state to said first state at time t2; and, when the switching time of said magnetic valve, t2-t1, is small, said actuator and said safety valve do not substantially change position.

2. Method for monitoring the functionality of an actuator for a safety valve, said actuator includes a pneumatic drive and a magnetic valve for controlling said pneumatic drive, comprising the steps of:

monitoring said first pneumatic conduit by measuring pressure in said first pneumatic conduit, said first pneumatic conduit interconnecting a position controller of said actuator and said magnetic valve, a second pneumatic conduit interconnecting said magnetic valve and said pneumatic drive;

switching said magnetic valve from a first state to a second state, said first state of said magnetic valve interconnecting said first pneumatic conduit and said second magnetic conduit, said second state of said magnetic valve venting said magnetic valve, said first and said second pneumatic conduits;

switching said magnetic valve from said second state to said first state; and, when the switching time of said magnetic valve, t2-t1, is large, said actuator and said safety valve change position.

3. Method according to claim 1, further comprising the steps of:

detecting the switching time, said switching time is detected by:

storing the time, t1, when said magnetic valve is switched from said first state of said magnetic valve to said second state of said magnetic valve, storing the time, t2, when said magnetic valve is switched from said second state of said magnetic valve to said first state of said magnetic valve, said switching time being equal to the quantity, t2-t1;

said step of monitoring said first pneumatic conduit by measuring pressure in a first pneumatic conduit includes measuring a first pressure, p1, and measuring a second pressure, p2, and p1-p2 being a pressure drop in said first pneumatic conduit; and, examining the functionality of said magnetic valve with reference to said pressure drop, p1-p2, in said first pneumatic conduit with reference to said switching time.

4. Method according to claim 2, further comprising the steps of:

detecting the switching time, said switching time is detected by:

storing the time, t1, when said magnetic valve is switched from said first state of said magnetic valve to said second state of said magnetic valve, storing the time, t2, when said magnetic valve is switched from said second state of said magnetic valve to said first state of said magnetic valve, said switching time being equal to the quantity, t2-t1;

said step of monitoring said first pneumatic conduit by measuring pressure in a first pneumatic conduit includes measuring a first pressure, p1, and measuring a second pressure, p2, and p1-p2 being a pressure drop in said first pneumatic conduit; and, examining the functionality of said magnetic valve with reference to said pressure drop, p1-p2, in said first pneumatic conduit with reference to said switching time.

5. Method according to claim 3, wherein:

repeating, using a plurality of variable switching times which are each of a duration which do not affect the position of said actuator or said actuator position remains essentially constant or unchanged, said step of switching said magnetic valve from a first state to a second state, said first state of said magnetic valve interconnecting said first pneumatic conduit and said second conduit enabling communication therebetween, said second state of said magnetic valve venting said magnetic valve, said first and second pneumatic conduits, followed by said step of switching said magnetic valve from said second state to said first state;

gathering and storing reference data, said reference data includes a plurality of said variable switching times, t2-t1, and a first plurality of pressure drops associated with each of said plurality of variable switching times, t2-t1; and, testing, using said stored plurality of variable switching times, t2-t1, which are each of a duration which do not affect the position of said actuator or said actuator position remains essentially constant or unchanged, said magnetic valve by switching said magnetic valve from a first state to a second state, said first state of said magnetic valve interconnecting said first pneumatic conduit and said second conduit enabling communication therebetween, said second state of said magnetic valve venting said magnetic valve, said first and said second pneumatic conduits, followed by said step of switching said magnetic valve from said second state to said first state;

gathering and storing testing data, said testing data includes said plurality of variable switching times, t2-t1, and a second plurality of said pressure drops associated with each of said plurality of variable switching times;

determining the status of said magnetic valve by comparing said second plurality of pressure drops associated with said testing data based on said plurality of switching times to said first plurality of pressure drops previously stored as reference data based on said plurality of switching times; and, generating a magnetic valve status notification based on said comparison of said second plurality of pressure drops associated with said testing data and said first plurality of pressure drops previously stored as reference data.

6. Method according to claim 4, wherein:

repeating, using a plurality of variable switching times which are each of a duration which do not affect the position of said actuator or said actuator position remains essentially constant or unchanged, said step of switching said magnetic valve from a first state to a second state, said first state of said magnetic valve interconnecting said first pneumatic conduit and said second conduit enabling communication therebetween, said second state of said magnetic valve venting said magnetic valve, said first and second pneumatic conduits, followed by said step of switching said magnetic valve from said second state to said first state;

gathering and storing reference data, said reference data includes a plurality of said variable switching times, t2-t1, and a first plurality of pressure drops associated with each of said plurality of variable switching times, t2-t1; and, testing, using said stored plurality of variable switching times, t2-t1, which are each of a duration which do not affect the position of said actuator or said actuator position remains essentially constant or unchanged, said magnetic valve by switching said magnetic valve from a first state to a second state, said first state of said magnetic valve interconnecting said first pneumatic conduit and said second conduit enabling communication therebetween, said second state of said magnetic valve venting said magnetic valve, said first and said second pneumatic conduits, followed by said step of switching said magnetic valve from said second state to said first state;

gathering and storing testing data, said testing data includes said plurality of variable switching times, t2-t1, and a second plurality of said pressure drops associated with each of said plurality of variable switching times;

determining the status of said magnetic valve by comparing said second plurality of pressure drops associated with said testing data based on said plurality of switching times to said first plurality of pressure drops previously stored as reference data based on said plurality of switching times; and, generating a magnetic valve status notification based on said comparison of said second plurality of pressure drops associated with said testing data and said first plurality of pressure drops previously stored as reference data.

7. Method according to claim 5, wherein said magnetic valve status notification is generated in a visible or electronic form.

8. Method according to claim 6, wherein said magnetic valve status notification is generated in a visible or electronic form.

9. Method according to claim 5, wherein said step of determining the status of said magnetic valve by comparing said second plurality of pressure drops associated with said testing data based on said plurality of variable switching times to said first plurality of pressure drops previously stored as reference data based on said plurality of variable switching times includes storing pressure drop differences between each of said second plurality of pressure drops and said first plurality of pressure drops for each of said plurality of variable switching times and further comprises the step of evaluating said pressure drop differences and provides a magnetic valve status notification which warns that said magnetic valve is still functioning but that its characteristics have changed.

10. Method according to claim 6, wherein said step of determining the status of said magnetic valve by comparing said second plurality of pressure drops associated with said testing data based on said plurality of variable switching times to said first plurality of pressure drops previously stored as reference data based on said plurality of variable switching times includes storing pressure drop differences between each of said second plurality of pressure drops and said first plurality of pressure drops for each of said plurality of variable switching times and further comprises the step of evaluating said pressure drop differences and provides a magnetic valve status notification which warns that said magnetic valve is still functioning but that its characteristics have changed.

11. Method according to claim 9, wherein said magnetic valve status notification is generated on the basis of a comparison of said pressure drop differences for each said switching time against a tolerated value of said pressure drop differences for each said switching time, said tolerated value of said pressure drop differences determined by varying the switching time and generating said reference data.

12. Method according to claim 10, wherein said magnetic valve status notification is generated on the basis of a comparison of said pressure drop differences for each said switching time against a tolerated value of said pressure drop differences for each said switching time, said tolerated value of said pressure drop differences determined by varying the switching time and generating said reference data.

13. Method according to claim 9, wherein said magnetic valve status notification is generated on the basis of a comparison of said pressure drop differences for each said switching time against a tolerated value of said pressure drop differences for each said switching time stored in memory.

14. Method according to claim 10, wherein said magnetic valve status notification is generated on the basis of a comparison of said pressure drop differences for each said switching time against a tolerated value of said pressure drop differences for each said switching time stored in memory.

15. Method according to claim 9, wherein an allowed tolerated value of pressure drop differences is calculated for an actual configuration based on stored reference values and data input by the user and said allowed tolerated value of pressure drop differences is used in said step of evaluating said pressure drop differences.

16. Method according to claim 10, wherein an allowed tolerated value of pressure drop differences is calculated for an actual configuration based on stored reference values and data input by the user and said allowed tolerated value of pressure drop differences is used in said step of evaluating said pressure drop differences.

17. Device for monitoring the functionality of an actuator for a safety valve, said actuator includes a pneumatic drive and a magnetic valve for controlling the pneumatic drive, comprising:

said actuator includes a position controller;

a first pneumatic conduit interconnecting said position controller of said actuator and said magnetic valve;

a second pneumatic conduit interconnecting said magnetic valve and said pneumatic; drive;

a pressure sensor for measuring pressure in said first pneumatic conduit;

said pneumatic drive of said actuator includes a safety position;

a control unit, said control unit switches said magnetic valve from a first state at time t1 to a second state and, then, said control unit switches said magnetic valve from a second state to said first state at time t2;

said control unit performs said switching at variable switching time lengths, t2-t1;

said pressure sensor measures a first pressure, p1, and measures a second pressure, p2, and p1-p2 being a pressure drop in said first pneumatic conduit for each of said variable switching time lengths, t2-t1;

a memory, said memory stores said variable switching time lengths, t2-t1, at which the position of the actuator remains substantially unchanged and said memory stores pressure drops, p1-p2 for each corresponding switching time lengths; and, an output unit for outputting a status notification based on a comparison of said pressure drops, p1-p2, from one measurement to another for a respective switching time length.

18. Device according to claim 17, wherein said pressure sensor is arranged within said position controller.

19. Device according to claim 17, wherein said position controller is implemented as digital position controller.

20. Device according to claim 17, wherein said control unit outputs a signal to said position controller for initiating measurement of pressure in said first pneumatic conduit, said signal being modulated onto a signal line, by means of a HART signal, by means of a radio signal or by means of a additional input for a current or voltage signal.

21. Device according to claim 17 wherein said position controller is connected to said magnetic valve such that it initiates the switching of said magnetic valve.

* * * * *